United States Patent [19]
Cai

[11] Patent Number: 6,158,328
[45] Date of Patent: Dec. 12, 2000

[54] APPARATUS AND METHODS FOR MAKING BEVERAGES

[76] Inventor: Edward Zhihua Cai, 4767 NW. Jeanice Pl., Corvallis, Oreg. 97330

[21] Appl. No.: 09/062,481

[22] Filed: Apr. 17, 1998

[51] Int. Cl.[7] .................................................... A47J 31/40
[52] U.S. Cl. .................. 99/293; 99/323.1; 261/DIG. 76; 366/101
[58] Field of Search .................................. 99/293, 323.1; 261/DIG. 16, DIG. 76, 121.1, 78.1; 366/101, 106, 107

[56] References Cited

U.S. PATENT DOCUMENTS

| 4,800,805 | 1/1989 | Mahlich et al. | 99/323.1 X |
| 5,330,266 | 7/1994 | Stubaus | 99/323.1 X |
| 5,738,002 | 4/1998 | Marano-Ducarne | 99/323.1 X |
| 5,768,981 | 6/1998 | Cicchetti | 99/323.1 X |
| 5,862,740 | 1/1999 | Grossi | 99/323.1 X |

*Primary Examiner*—Reginald L. Alexander

[57] ABSTRACT

An apparatus and methods for making drinks such as cappuccino, latte, espresso, coffee or filtered water which comprise a cold water filter system for purifying water for either direct consumption or use in extracting flavor-containing materials like coffee, a hot water filter assembly located on the brew head for removing impurities originated from both water itself and the parts of the apparatus in contact with water, and/or an automatic milk frother for frothing the milk. The cold water filter system comprises a removable water container having at its bottom a water flow passageway, a filter cartridge removably mounted in the water flow passageway, a containing chamber for receiving filtered water, and a valve in the water flow passageway for automatically closing the passageway when the container is removed from and opening the passageway when placed onto the chamber. The hot water filter assembly comprises a filter cartridge having a hot water inlet and an outlet, a water distribution chamber formed between the brew head and cartridge inlet and encircled by an elastomer sealing ring, and a fixture for removably receiving the cartridge and retaining the cartridge in position to maintain the water distribution chamber intact during the operation of the apparatus. The milk frother comprises a nozzle for transforming the steam into a steam jet, a chamber having an inlet port for receiving the steam jet, liquid passageway for drawing liquid into the chamber and an outlet port below the inlet port, liquid jet for transforming the liquid in the chamber into a liquid jet, an arrangement that allows the liquid jet to thrust into the liquid in a container and thereby producing fine air bubbles or foam in the liquid in the container, and foam level control for controlling the amount of foam to be produced.

21 Claims, 4 Drawing Sheets

APPARATUS AND METHODS FOR MAKING BEVERAGES

FIELD OF THE INVENTION

The present invention relates to apparatus and methods for making drinks like espresso, cappuccino, coffee, tea, and filtered water for human consumption and enjoyment. More particularly, the invention relates to apparatus and methods for removing water impurities which are originated from water itself or the parts of the apparatus in contact with water to produce filtered water either for direct human consumption or for use in preparing other drinks, and for frothing milk for making milk-containing drinks like espresso, cappuccino and latte.

BACKGROUND OF THE INVENTION

Water is a increasingly popular drink, and is used to brew other drinks such as coffee, tea and espresso. Water vapor or steam is used to heat and froth milk for making cappuccino, latte and other drinks containing milk. Water filtration is known to improve water taste and the taste of drinks made from the filtered water. Water filtration pitchers has been increasingly used to filter water for either direct consumption or for use with automatic drip coffeemakers in preparing coffee. Water filtration have also been integrated into automatic drip coffeemakers by forming a cavity at the outlet of the water reservoir for receiving a water filter cartridge and directing the filtered water to the water heater as soon as it exits the cartridge. Such arrangement has several drawbacks. First, it can not provide a supply of filtered water as quickly as required by apparatus like espresso/cappuccino machines and those disclosed in U.S. Pat. No. 5,267,506. Second, it has low filtration efficiency because it can only use relatively large activated carbon particles to achieve the flow rate required by the automatic drip coffeemakers. Third, none of the current coffeemakers can produce filtered water for direct consumption. Forth, a partially clogged water filter cartridge will change the water flow rate through the water heaters of the automatic drip coffeemakers, thus may cause changes in coffee temperature and taste. Fifth, the water filter cartridge provide a bed for bacteria growth and may produce foul odor. At last, the water filter cartridge can not remove the plastic odor and impurities in the water which result from contacting the plastic, rubber and metal parts of the apparatus. U.S. Pat. No. 5,393,548 discloses a device and method for filtering impurities from the water by positioning a water filtration device between the hot water drip outlet of an automatic drip coffeemaker and the ground coffee in a filter. This device and method resolved to some degree the fourth and sixth drawbacks mentioned above with the existing water filter systems for automatic drip coffeemakers, but it caused additional problems including that water may overflow the top of the device and get to the ground coffee unfiltered and that the device may be covered with ground coffee and cause additional cleaning work for the consumers.

Currently, none of the commercially available espresso and cappuccino machines have water filter system, although the consumers who drink espresso-based beverages like espresso, latte and cappuccino are normally more conscious to coffee quality and taste than the consumers who drink only regular coffee. There is currently no known water filtration system which can be adapted to the espresso and cappuccino machines and the apparatus disclosed in U.S. Pat. No. 5,267,506 without major inventive modifications. There is neither known water filtration system for producing purified water for producing steam for frothing milks for making milk-containing drinks like cappuccino and latte.

Cappuccino, latte and other milk-containing drinks are made by adding espresso into milk, or vice versa. Prior to mixing milk with espresso, the milk is frothed with a jet of steam to produce a foamy head and to heat the milk to a desired temperature. The simplest frothing device consists of a steam tube having an orifice at one end for producing a steam jet. The espresso machine operators position the orifice just below the surface of milk and bobs the milk container up and down to inject air into the milk. After enough foam is produced, the steam tube is inserted down into the milk to further heat the milk without producing more foam. Here, experience is crucial to obtain satisfactory results because if you have the nozzle too deeply into the milk there will be no foam, if you have it too shallow it will spray milk all over.

A first modified form of the frothing device, as disclosed in U.S. Pat. Nos. 4,735,133, 4,800,805, 4,945,824, and 5,335,588, has an air tube with a first end next to the orifice of the steam tube and a second end far above the surface of milk, thus making air available to the milk near the steam orifice even if the orifice is immersed in the milk. The air tube is very restrictive to reduce and control the flow of air into the tube. One problem arises with this modified frothing device in that after the milk container is full of foam or after the desired amount of foam has been produced, it is difficult to further heat the milk without producing more foam. Consequently, you may have to either satisfy with a lukewarm milk or suffer a mess caused by milk overflowing. A second problem with this device is that the air tube is very vulnerable to clogging by milk, dusts, etc., thus making the frothing operation inconsistent and frustrating. A third problem arises with this device in that there are various types of milk and they may require more or less air flow to achieve optimum frothing. To correct the third problem, the air tube needs a valve to adjust the air flow, which makes the device complex and difficult to use.

A second modified form of the frothing device, as disclosed in U.S. Pat. Nos. 4,779,519, 4,949,631, 5,265,519 and 5,330,266, comprises a chamber having a steam inlet, an air inlet, a milk inlet and an outlet for the above three fluids. The steam gushing from the steam inlet aspirates and entrains, by the venturi effect, the air from the air inlet and the milk from the milk inlet. The air from the air inlet, steam from the steam inlet and milk from the milk inlet are mixed in the chamber or in an extension of the chamber to produce an emulsion or frothed milk, which flows out of the outlet of the chamber and is collected in a container for use in making cappuccino, latte, and other heated drinks. To avoid the lack of foam in the frothed milk due to too little air or big air bubbles due to too much air into the chamber via the air inlet, Marano-Ducarne (U.S. Pat. No. 5,738,002) and Stubaus (U.S. Pat. No. 5,330,266) taught various means to control the air flow into the chamber. To avoid inconsistent temperature of the frothed milk due to variation in milk flow rate into the chamber from a cold milk supply, Grossi (U.S. Pat. No. 5,862,740) taught a valve to control the cold milk flow rate into the chamber. There are several critical problems with such modified milk frothing devices. First, the air inlet in such modified milk frothing devices must be small and is thus subject to clogging by milk and particles, which greatly reduces the reliability and increase the chance of product returns by the consumers. Second, to meet the consumer needs to froth the different types of milks such skim, low fat and regular milks, to obtain different amount of foam, or to achieve different milk temperatures, these modified devices need valves to adjust the air and milk flow into the chamber, which complicates the device and the operation. Thirdly, such modified frothing device is sensitive to operation variables such as steam flow rate, the liquid level and temperature of the cold milk supply, vacuum level in the chamber and partial clogging of the air or milk inlet. As a result, the frothed milk often has inconsistent quality in terms of temperature, foam quantity and other important characteristics. At last, these modified devices are normally very noise due to the mixing of air, milk and steam in the chamber and release significant amount of steam during the frothing operation, which sometimes intimidates and confuses the operators.

A third modified form of the frothing device involves a spinning blade at the end of the steam tube. Steam whirls the blade like a miniature turbine to break air bubbles into smaller ones to stabilize the resulting foam. This method, however, requires the operators to keep moving the milk container downward during frothing process to ensure that the air vent in the blade attachment is just at the surface of the milk.

The present invention provides apparatus having novel and improved means for making filtered water either for direct consumption or for use in preparing drinks such as espresso, coffee, cappuccino and latte and for automatically frothing milk, and is aimed at solving the problems associated with the existing apparatus for making such drinks.

SUMMARY OF THE INVENTION

In accordance with the present invention, there is provided a new apparatus and methods for making cappuccino, latte, espresso, coffee, tea and/or other drinks for human consumption and enjoyment. The apparatus comprises a cold water filter system for preparing purified water from a supply of water that may contain impurities either for direct consumption or for use in making drinks such as espresso, coffee, cappuccino and latte, water heating and delivering means for heating the purified water and delivering the hot water and steam, a hot water filter assembly for filtering the impurities which are originated either from the water itself or the parts of apparatus in contact with water, a coffee filter for receiving a supply of flavor-containing material such as coffee and for allowing the extraction of the flavor-containing material by the hot water therein, and/or an automatic milk frother for automatically producing any amount of foamy head on the milk as desired by the operators of the apparatus.

The cold water filter system comprises a first containing means for receiving a supply of water which may contain impurities, a second containing means for receiving the filtered water, a water flow passageway having one end connected to the bottom portion of the first containing means and the other end extended into the second containing means, a water filter cartridge removably mounted in the water flow passageway, an automatic valve located in the water flow passageway for automatically closing the passageway when the first containing means is removed from the second containing means and opening the water flow passageway when the first containing means is placed onto the second containing means, and discharging means such as a spigot and outlet located near the bottom of the second containing means for discharging the filtered water for either drinking directly or preparing other drinks. The water filter cartridge comprises a first cylindrical chamber having one end generally open and the other end made of a porous wall, a second cylindrical chamber having one end generally open and the other end made of a porous wall, snap locking means formed at the open end of the first cylindrical chamber and the porous wall end of the second cylindrical chamber, a space formed between the porous wall of the first and second cylindrical chambers after the second cylindrical chamber is snapped into the first cylindrical chamber, and a predetermined amount of filter materials like activated carbon confined in the space. In a modified embodiment of the cold water filter system, the first containing means is permanently attached to the second containing means and the automatic valve is replaced with venting means connected to the second containing means. The venting means releases the air trapped in the second containing means during the water filtration and admits air into the second containing means during the discharging of the filtered water.

The hot water filter assembly is located at the outlet of the brew head so that the impurities originated from both water itself and from the parts of the apparatus in contact with water are removed right before the hot water reaches the flavor-containing material in the coffee filter. The hot water filter assembly comprises a water filter cartridge having a cartridge inlet for receiving the hot water from the outlet of the brew head and a cartridge outlet for discharging the filtered water into the coffee filter, a water distribution chamber formed between the outlet of the brew head and the cartridge inlet and encircled by an elastomer ring member to achieve a water-tight seal between the brew head and the cartridge inlet so that all the hot water from the brew head is directed into the water filter cartridge, and a fixture for removably receiving the water filter cartridge and for retaining the cartridge in position to maintain the water-tight seal between the brew head and the cartridge inlet during the operation of the apparatus. In one embodiment of the hot water filter assembly, the fixture is a compartment attached to the brew head and comprises a substantially round support base, a support side wall of a predetermined height perpendicular to the support base, and an opening for receiving the cartridge into the compartment. In another embodiment of the hot water filter assembly, the fixture comprises a bolt formed on the brew head and dimensioned to insert into a hole formed in the filter cartridge and a nut for locking the filter cartridge in position after the filter cartridge is inserted into the bolt.

The automatic milk frother is connected to the water heating and delivering means through a steam-supplying conduit. It comprises nozzle means for transforming the steam into a steam jet, a chamber having an inlet port for receiving the steam jet and a fluid outlet port, means for producing a vacuum in the chamber by the steam jet, liquid passageway means in communication with the chamber for introducing liquid into the chamber, liquid jet means for transforming the liquid in the chamber into a liquid jet, an arrangement that allows the liquid jet to thrust into the liquid in a containing means thereby producing fine air bubbles or foam in the containing means, and foam level control means for controlling the amount of foam to be produced. The liquid jet means can be a small diameter conduit having one end connected to the fluid outlet port of the chamber and the other end directed towards the liquid in the containing means for issuing the liquid jet. The foam level control means, in one embodiment of the invention, comprises a hollow cylindrical chamber constructed to enclose the liquid jet and adapted to be moved up and down relative to the liquid jet means and, in another embodiment of the invention, comprises a fluid inlet for fluid such as air and foam, a fluid passageway for providing communication between the fluid inlet and the liquid jet and positioning means for the operator of the apparatus to set the fluid inlet at a certain position according to the amount of foam desired prior to frothing the liquid. The foam level control means selectively introduces air to the liquid jet in the containing means, thus generating foam in the liquid in the containing means, before a desired amount of foam is been produced and introduces foam to the liquid jet, thus regenerating the foam in the liquid in the containing means, after the desired amount of foam is produced.

It is an object of the present invention to provide an apparatus for making drinks such as espresso, coffee, cappuccino, latte, filtered water, or tea for human consumption and enjoyment.

It is a further object of the present invention to provide an apparatus which has a cold water filter system for making filtered water either for direct human consumption or for use in preparing other drinks like espresso, cappuccino, coffee or tea.

It is a still further object of the present invention to provide an apparatus which has a cold water filter system that can instantly provide a certain amount of filtered water either for direct human consumption or for use to prepare other drinks like espresso, cappuccino, coffee or tea.

It is a still further object of the present invention to provide an apparatus for making drinks like espresso, cappuccino, filtered water, coffee or tea which has a removable water reservoir and a water passageway connected to the reservoir in which a water filter cartridge and an automatic flow valve are disposed, thus allowing the operators of the apparatus to remove the reservoir, fill it with water from a water source like a water faucet and replace it into the apparatus without worrying about water leaking out of the reservoir and filter cartridge.

It is a still further object of the present invention to provide an apparatus which has a hot water filter assembly for removing the impurities originated from the water itself and parts of the apparatus in contact with the water before the hot water is brought into contact with flavor-carrying materials like coffee or tea.

It is a still further object of the present invention to provide an apparatus for making drinks like espresso and cappuccino which has a hot water filter assembly located on the brew head that allows consumers to easily mount and remove the disposable water filter cartridge.

It is a still further object of the present invention to provide an apparatus which has a novel device for automatically frothing milk which requires little maintenance and trouble free.

It is a still further object of the present invention to provide an apparatus which has a novel device for automatically frothing milk which requires no air inlet holes or channels which are easy to be clogged by milk or particles.

It is a further object of the present invention to provide an apparatus which has a novel device and method for frothing milk in an essentially automatic manner so that the quality and quantity of the foam as well as the temperature of the frothed milk are essentially independent of the operator's skill.

It is a still further object of the present invention to provide a novel attachment for frothing milk which does not require small, easy-to-clog holes as seen in existing milk frothing attachment in espresso/cappuccino machines.

It is a further object of the present invention to provide an apparatus which has a novel device that can froth milk essentially automatically and can indicate to the operators when the milk temperature is ready.

These and other objectives and advantages of the present invention will become apparent from the following description of the preferred embodiments, taken together with the accompanying drawings.

DESCRIPTION OF THE DRAWING

The accompanying drawing illustrates diagramatically non-limitative embodiment of the invention, as follows.

DETAILED DESCRIPTION OF THE PREFERRED EMBODIMENTS

Figure 1:
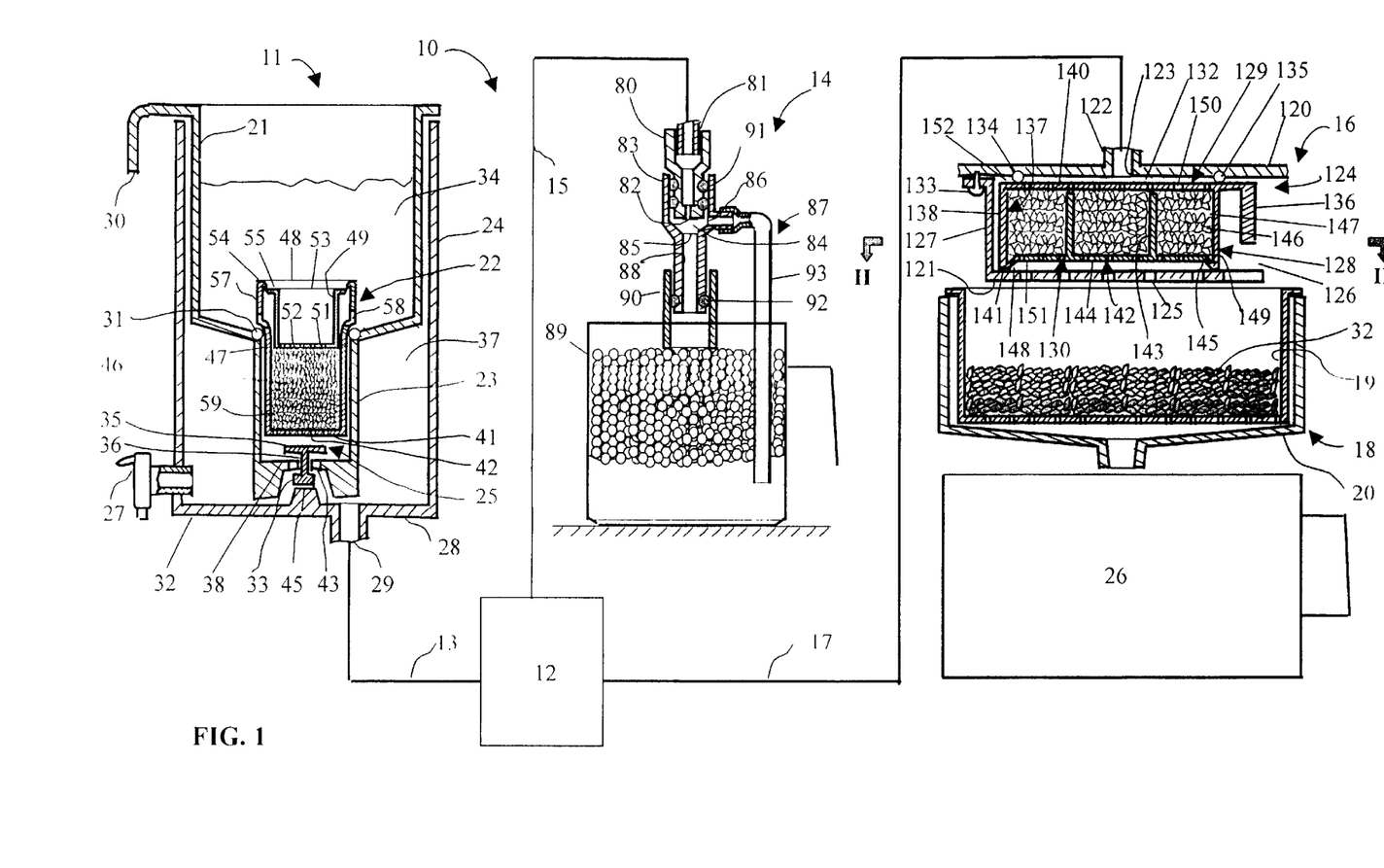
FIG. 1 is a schematic diagram showing the constitution of an apparatus for making drinks such as espresso, coffee, cappuccino, or filtered water in accordance with the present invention.

FIG. 1 shows certain parts of an apparatus 10 for making drinks such as espresso, latte, cappuccino, coffee, tea, filtered water, or any combination of them which embodies one form of the present invention. Only those parts of the apparatus are shown which are necessary for full understanding of the invention. For example, the housing for the apparatus 10 and the parts for connecting the energy-consuming units of the apparatus to an energy source such as an electrical outlet have been omitted for the sake of clarity and simplicity. All such parts which are not specifically shown but necessary in order to render the apparatus fully operative can be similar, analogous or identical to the corresponding parts heretofore conventionally known and used in existing apparatus for making drinks such as steam espresso machines, pump espresso machines, water filter devices, and automatic drip coffeemakers.

Apparatus 10 comprises a cold water filter system 11, a water heating and delivering system 12 connected to the cold water filter system through conduit 13, an automatic milk frother 14 connected to the water heating and delivering system through a steam conduit 15, a hot water filter assembly 16 connected to the water heating and delivering system through a hot water conduit 17, a flavor extraction system 18 having a coffee filter 19 for receiving a supply of flavor-carrying material 32 and a filter holder 20, and a receptacle 26 below said flavor extraction system for receiving the flavor-containing water from the filter holder. The water heating and delivering system 12 can be, but not limited to, the water heater and pump used in pump espresso machines, the water heating and steam pressure generation system in steam espresso machines, the water heating and delivering system used in automatic drip coffeemakers, and the water heating and delivering system disclosed in U.S. Pat. No. 5,267,506. The flavor extraction system 18 can be, but not limited to, the coffee filter assembly in pump espresso machines, steam espresso machines, and automatic drip coffeemakers.

Cold water filter system 11 comprises a first container 21 for receiving unfiltered water 34, a second container 24 on which the first container is removably mounted for receiving the filtered water 37, a water flow passageway chamber 23 having one end connected to the bottom portion of the first container 21 and another end extended into the second container 24, a water filter cartridge 22 removably mounted in the chamber 23 for filtering the water in the first container, an automatic valve 25 located at bottom plate 38 of the chamber 23 for automatically shutting off the water flow through the water flow passageway chamber when the first container is removed from the second container and opening the water flow when the first container is mounted on the second container, a spigot 27 located near the bottom 28 of the second container for dispensing the filtered water to a cup or other containers for direct consumption, and an outlet 29 located at bottom 28 for introducing the filtered water to the water heating and delivery system 12. The first container 21 is dimensioned to loosely fit onto the second container 24 so that there is a gap between the two containers functioning as an air vent to release the air trapped in the second container when filtering the water and to admit air into the second container when discharging the filtered water. The first container 21 has a handle 30 for easy handling of the container and an o-ring 31 located at the upper end of the water flow passageway chamber 23 for providing a water-tight seal between the chamber 23 and water filter cartridge 22.

The automatic valve 25 comprises an opening 43 formed on the bottom plate 38, a sealing disc 35 for sealing the opening 43 when the first container 21 is removed from the second container 24, a retaining disc 33 for retaining the sealing disc in position, a connection stem 36 for connecting the sealing disc and retaining disc, prevention stems 44 (FIG. 1a) formed on the inner peripheral of the opening 43 for preventing the retaining disc 33 from being pushed out of opening 43, and a protrusion 45 formed at the bottom 28 of the second container 24. The sealing disc 35, retaining disc 33 and connection stem 36 can be one integral part made of elastomer material. The lower end of the retaining disc 33 can be smaller than the upper end of the retaining disc 33 to facilitate the insertion of the retaining disc 33 into the opening 43 during assembly.

Figure 1A:
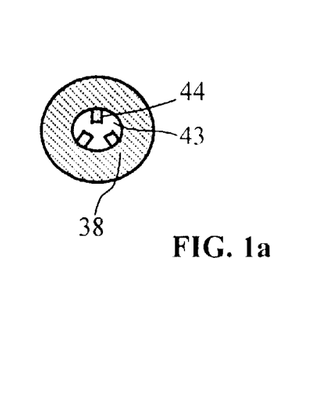
FIG. 1a is a sectional view of the bottom 38 of outlet chamber 23 of the cold water filter system 11 shown in FIG. 1 showing the prevention stems 44.

The automatic valve for automatically shuts off the water flow through the water flow passageway chamber 23 when the first container 21 is removed from the second container 24, i.e. it operates in the "Close" mode in which the sealing disc 35 covers the opening 43 on the bottom plate 38 due to the weight of the retaining disc 33, sealing disc 35 and retaining stem 36 thereby blocking the water flow out of the first container, and automatically opens the water flow when the first container is mounted on the second container, i.e. it operates in the "Open" mode in which the sealing disc 35 is pushed away from opening 43 by the protrusion 45 thereby allowing the water to flow out of the first container through the filter cartridge 22 into the second container. To insure that a perfect seal is formed between sealing disc 35 and bottom plate 38, a spring (not shown) can be placed between the prevention stems 44 and the retaining disc 33 so that the spring force pulls the sealing disc 35 towards the opening 43 to improve the seal between the sealing disc 35 and the bottom 38 when the automatic valve 25 is in its "Close" mode.

The water filter cartridge 22 comprises a first cylindrical chamber 47 having a lower end 41 with numerous small openings 42 and an open upper end 48, a second cylindrical chamber 49 insertable into the first cylindrical chamber having a lower end 51 with numerous small openings 52 and an open upper end 53, a space 59 formed between the lower end 41 of the first cylindrical chamber and the lower end 51 of the second cylindrical chamber, and filter materials 46 such as activated carbon contained in the space. The openings 42 and 52 are small enough to retain the filter materials 46 in the space 59. A tapered internal shoulder 54 is formed on the upper end 48 of the first cylindrical chamber and a tapered external shoulder 55 is formed on the upper end 53 of the second cylindrical chamber. Shoulders 54 and 55 are dimensioned so that the second cylindrical chamber 49 can be snapped into the first chamber 47 to form a locking snap fit. A enlarged portion 57 is formed near the upper end of the first cylindrical chamber to retain part of water filter cartridge 22 above the chamber 23 for easy mounting and removing of the cartridge. Side water inlet 58 are formed on the peripheral walls of the first and second cylindrical chamber near the lower end of the enlarged portion 57 to allow the water below the upper end of water filter cartridge 22 in the first container 21 to enter the cartridge. The first and second cylindrical chambers are dimensioned so that the gap between the outer peripheral of the second cylindrical chamber and the inner peripheral of the second cylindrical chamber is smaller than filter materials to prevent the filter materials from leaking out of the space 59.

A first important advantage of the improved water filter system is that it enables the apparatus to produce filtered water either for direct consumption or for use in making other drinks such as coffee, espresso, cappuccino and/or tea. A second important advantage of the improved water filter system is that it stores the filtered water 37 in the second container 24 that communicates with atmosphere through the gap between the first and second containers, therefore meeting the periodic high flow-rate need of pump espresso machines and the apparatus disclosed in U.S. Pat. No. 5,267,506, which need has not been met by the existing gravity water filter technology. A third important advantage of the improved water filter system is that it allows one to take only the first container 21 to a water faucet for refilling rather than to take the whole water filter system as required by existing drink water filter systems like water filter pitchers. It is appreciated that the cold water filter system 11 can be constructed either as an independent apparatus for making filtered water or as an accessory attached to another apparatus which requires the use of water for making drinks such as espresso, coffee, cappuccino and latte.

Figure 2:
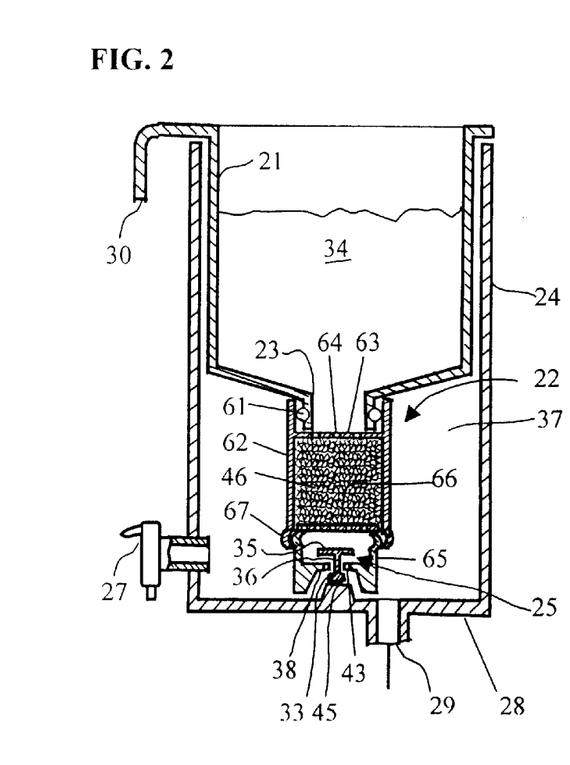
FIG. 2 is a sectional elevation view of another embodiment of the cold water filter system 11 shown in FIG. 1.

FIG. 2 shows a modified embodiment of the cold water filter system 11 of FIG. 1, wherein the automatic valve 25 is located at the lower end of the water filter cartridge 22 rather than at the lower end of the chamber 23 of the first container 21. The water filter cartridge is mounted to the chamber 23 through a pair of O-ring 61. The water filter cartridge comprises a first cylindrical chamber 62 having an upper end 63 with small openings 64 an open lower end, a second cylindrical chamber 65 insertable into chamber 62 having the automatic valve 25 formed at its lower end, a porous sheet material 66 sandwiched between the open lower end of the first cylindrical chamber 62 and the open upper end of the second cylindrical chamber 65, filter materials 46 contained in the cylindrical space between the porous sheet material 66 and the upper end 63 of the first cylindrical chamber 62, and snap attachment details 67 formed at the open lower end of the first cylindrical chamber 62 and the open upper end of the second cylindrical chamber 64 for attaching in a snapping manner the first cylindrical chamber to the second cylindrical chamber. This modified cold water filter system can avoid the dripping of water when replacing the filter cartridge, in addition to all the advantages of the cold water filter system 1 of FIG. 1.

Figure 3:
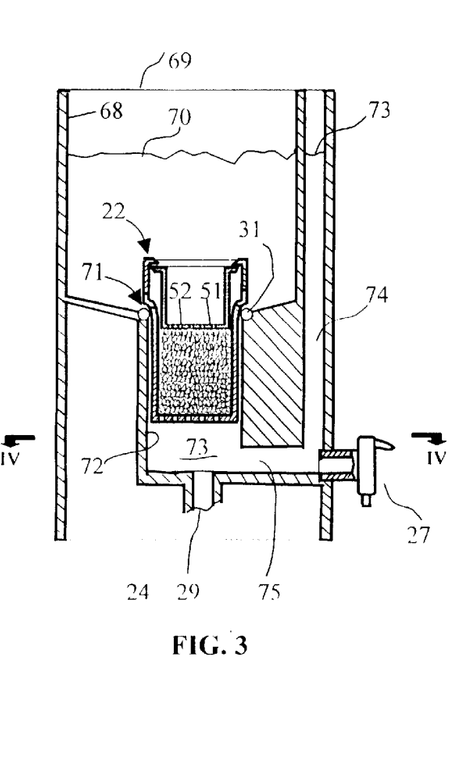
FIG. 3 is a sectional elevation view of another embodiment of the cold water filter system 11 shown in FIG. 1.
Figure 4:
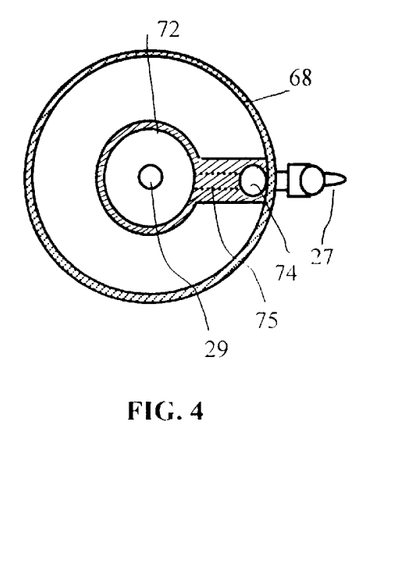
FIG. 4 is a sectional view along line IV—IV of FIG. 3.

Another modified embodiment of the cold water filter system 11 of FIG. 1 is specified, which, as illustrated in FIGS. 3 and 4, comprises a first containing chamber 68 having a generally open upper end 69 for receiving a supply of unfiltered water 70 and an outlet port 71, a second containing chamber 72 connected to said outlet port 71 for receiving a water filter cartridge 22 and storing filtered water 73, and a vent conduit 74 in communication with said second containing chamber 72 through a passageway 75 for both venting the air trapped in said second containing chamber below said water filter cartridge during filtration and for admitting air into said second containing chamber during the discharging of the filtered water. The water filter cartridge 22, which is identical to the water filter cartridge 22 of the cold water filter system 11 of FIG. 1, is removably mounted in the upper portion of said second chamber 72 and sealed against said outlet port 70 of said first containing chamber through O-ring 31. The second containing chamber 72 is generally smaller than the first containing chamber 68, but it is sufficiently large to hold at least one cup of filtered water 73. The filtered water 73 can be discharged through either spigot 27 or outlet 29, both of which are located at the bottom portion of said second containing chamber 72. This modified cold water filter system reduces the bacteria growth in the system by maintaining the majority of the water in said first containing chamber 68 as unfiltered water, which still contains the disinfecting agent like chlorine for inhibiting bacteria growth. This modified cold water system also has all the advantages of the cold water filter system 11 of FIG. 1 except that unlike the first and second containers of the cold water filter system of FIG. 1, the first and second containing chambers are not removable from each other. It is appreciated that this modified cold water filter system can be constructed either as an independent apparatus for making filtered water or as an accessory connected to another apparatus which requires the use of water for making drinks.

Refer now to the automatic milk frother 14 of FIG. 1, the milk frother comprises nozzle means 80 having a thread 81 for connecting with the steam-supplying tube 15 and an orifice 82 for generating a steam jet, a cylindrical chamber 83 positioned below orifice 82 having a steam inlet port 84 for receiving the steam jet, an inlet port 86 for the fluids such as milk to enter the chamber 83 and an outlet port 85 which is concentric or in line with orifice 82 so that the steam jet can cause a vacuum in at least part of the chamber 83, liquid passageway means 87 such as a flexible tube 93 connected to the inlet port 86 for introducing the fluid such as milk into the chamber 83, a liquid jet conduit 88 having a first end connected to the outlet port 85 and a second end positioned substantially downwards for transforming the liquid such as milk which is drawn into the chamber 83 by the vacuum in the chamber into a liquid jet, a container 89 which is positioned directly below the liquid jet conduit to allow the liquid jet to thrust into the liquid in the container thereby producing fine air bubbles or foam in the container, and a hollow cylinder 90 adapted to be moved up and down along the liquid jet conduit for controlling the amount of foam to be produced on the liquid in container 89. The cylindrical chamber 83 may conveniently be frictionally attached and sealed to the lower part of nozzle means 80 by means such as elastic sealing rings 91 fitted to the nozzle means 80. The hollow cylinder 90 may be slidably attached and sealed to the liquid jet conduit 88 by means such as a pair of O-rings 92.

It is preferred that the orifice 82, liquid jet conduit 88, and hollow cylinder 90 are concentric or in line with each other to increase the speed of the liquid jet into the liquid in container 89, thus increasing the quality of the foam on the liquid formed in the container. The inner diameter of the liquid jet conduit is approximately 0.7 mm to 7 mm, and preferably 1 to 3 mm for the milk frother 14 to be attached to a pump or steam espresso machine. The length of the liquid jet conduit can be approximately 1 to 120 mm, and preferably 2 to 50 mm, depending on the diameter of the liquid jet conduit chosen. Although the liquid jet conduit used in this exemplary embodiment is of straight tubular structure, it is appreciated that the liquid jet conduit may be of a curved tubular structure. The liquid passageway means 87 is dimensioned and structured to reduce the liquid flow resistance to the cylindrical chamber 83. The orifice 82 has a diameter that is normally smaller than the diameters of the outlet 85 and liquid jet conduit 88, in order to increase the speed of the steam jet and subsequently the speed of the liquid jet. The distance between the orifice 82 of the nozzle means 80 and the outlet 85 or the liquid jet conduit 88 is small enough that the majority of the speed energy of the steam jet from nozzle means 80 is transferred to the liquid jet issuing from the liquid jet conduit 88.

It is appreciated that hollow cylinder 90 may not be needed for the production of foam by the liquid jet from liquid jet conduit 88. For the milk frother 14 without the hollow cylinder 90, the amount of foam or foam level to be produced in the container 89 may be controlled by moving up and down either the milk frother 14 or the container 89. It is also appreciated that there are other means, such as a support member having a cylindrical hole of predetermined diameter and length, for transforming the liquid such as milk which is drawn into said cylindrical chamber 83 into a liquid jet. It is also appreciated that a liquid jet passageway such as a chamber and tubular body may be formed at or connected to the second end of the liquid jet conduit 88 for allowing the liquid jet to pass freely through the liquid jet passageway without touching the wall of the liquid jet passageway (not shown in FIG. 1). The liquid jet passageway is significantly larger than the liquid jet conduit 88 and helps reducing milk splashing and overflow, especially at the end of the frothing operation. It is also appreciated that the hollow cylinder 90 helps reducing the splash of milk after the milk is heated to above certain temperature. It is also appreciated that the flexible tube 93 can be immersed into a supply of liquid such as milk contained in a vessel other than the container 89, and in such arrangement the container 89 is used for receiving the liquid jet and forming foam.

To froth milk using the milk frother 14 disclosed above, pour a desired amount of cold milk into container 89 and place the flexible tube 93 into the liquid in the container. Adjust the position of the hollow cylinder 90 with the understanding that the distance between the lower end of the hollow cylinder and the surface of milk in the container will be approximately equal to the thickness of the foam to be produced on the milk.

Turn on the steam. A steam jet is issued from orifice 82 of the nozzle means 80 and causes a vacuum in the chamber 83. The vacuum in chamber 83 draws liquid into the chamber through the liquid passageway means 87. The steam jet then forces the liquid in the chamber 83 out of the chamber through outlet 85 and into liquid jet conduit 88. After entering the liquid jet conduit, the liquid is transformed into a thin stream and is subsequently issued at the end of the liquid jet conduit as a liquid jet of high speed. The liquid jet brings the surrounding air with it as it thrusts into the milk in the container 89, therefore producing foam in the container. The surface of the foam keeps rising as more foam is produced in the container. After the foam level reaches or covers the lower end of the hollow cylinder 90 as illustrated in FIG. 4, the foam in the vicinity of the liquid jet rather than air is brought into the milk in the container by the liquid jet. The foam which is brought into the milk in the container is regenerated, and normally at higher quality. Since little additional foam is now produced, the foam level will stay at about the level of the lower end of the hollow cylinder 90 or rise very slowly. In case that the surface of foam falls below the lower end of the hollow cylinder, thus making the surrounding air available to the liquid jet, additional air will be brought into the milk. As a result, more foam will be produced until the surface of foam reaches the lower end of the hollow cylinder again.

After the foam level reaches the lower end of the hollow cylinder, the main effect of the steam is to heat up the milk. After the milk is heated to a certain temperature, which is usually a little below the boiling point and is the temperature just right for making milk containing drinks like cappuccino and latte, it is discovered that the liquid jet in most cases disappeared and the rate at which the milk is introduced into the chamber cylindrical 83 is decreased. It is also discovered that significantly more steam comes out of the liquid jet conduit 88 and the milk frothier produces significantly more noise after the frothed milk in the cup has reached a desired temperature for use in making latte, cappuccino, and other milk-containing drinks. It is noticed that in some cases, especially when the lower end of the liquid jet conduit 88 from which end the liquid jet issues is close to the foam level in the container, the foam level in the container may start to increase quickly. Any of these signs, especially the increases in the steam quantity, noise level and foam level, can be used as the indicators to show the operators that the milk has been heated to the right and is ready for use in making cappuccino or latte. As the operator notice any of these signs, he/she should turn off the steam.

If the hollow cylinder 90 is removed from the milk frothier 14, the foam level in the container may continue to rise until it reaches the lower end of the liquid jet conduit 88 from which end the liquid jet issues. In this case the foam level is close the lower end of the liquid jet conduit after the certain milk temperature is reached, the foam level will most likely increase quickly and may cause milk overflow.

It is appreciated that in some cases the milk may be heated to the certain temperature, i.e. the frothed milk may become ready, before the foam level in the container reaches the lower end of the liquid jet conduit 88 if the milk frothier does not have the hollow cylinder or the lower end of the hollow cylinder 90 if the milk frothier has the hollow cylinder. In such cases, the operator can turn off the steam when the steam becomes visible around the liquid jet or the noise from the milk frothier starts to increase significantly.

A unique feature of the automatic milk frothier 14 as disclosed above is that after turning on the steam, the espresso machine operators can leave the milk frothier alone and do whatever else they want to do. The milk frothier will then inform the operators that the frothed milk is ready by either visible appearance of steam or audible increase in frothing noise. Besides giving the espresso machine operators great freedom, such an automatic frothing operation makes the quantity and quality of foam on the top of the frothed milk as well as the milk temperature very consistent and essentially independent of the skill of the operators.

Figure 5:
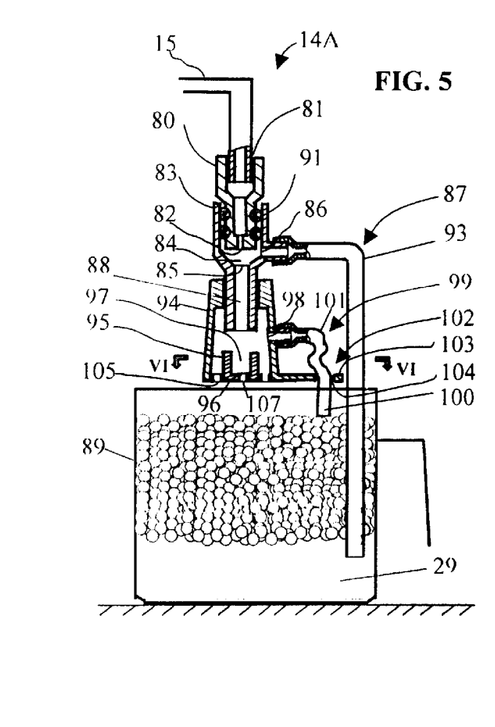
FIG. 5 is a sectional elevation view of another embodiment of the automatic milk frother 14 shown in FIG. 1.
Figure 6:
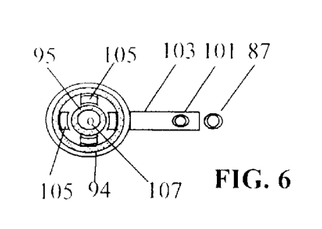
FIG. 6 is a sectional view along line VI—VI of FIG. 6.

FIGS. 5 and 6 show a modified embodiment of the automatic milk frothier 14 of FIG. 1, wherein the liquid jet from the liquid jet means 88 thrusts into the liquid maintained in a containing chamber 94 attached to the liquid jet conduit 88. A circular retaining wall 95 is formed on the bottom plate 96 of said containing chamber 94 to define a space 97 directly below liquid jet conduit 88. During the operation, a certain amount of liquid can be maintained in the space 97 of containing chamber 94. An air inlet 98 is formed at the upper portion of containing chamber 94 for air to enter the containing chamber. The modified milk frothier 14A may further comprise foam level control means 99 for controlling the amount of foam to be produced on the milk in container 89. Foam level control means 99 comprises a fluid inlet 100 for air and foam, a fluid passageway 101 such as a flexible tube connected to air inlet 98 for providing communication between the fluid inlet 100 and the containing chamber 94, and positioning means 102 having a fixture 103 attached to the peripheral wall of the containing chamber 94 and an aperture 104 into which the flexible tube 101 frictionally fit. Openings 105 are formed on the bottom plate 96 of containing chamber 94 to discharge the liquid and foam. A draining hole 107 is formed on the bottom plate within the retaining wall 95 to drain the liquid in the space 97 at the end of each frothing operation.

It is appreciated that the modified milk frothier 14A may be altered by removing the bottom plate 96 and the parts formed on the bottom plate and by increasing the length of containing chamber 94 so that the liquid jet from liquid jet conduit 88 is substantially encircled by the containing chamber 94 and becomes normally not visible to the operator (not shown). It is also appreciated that the modified milk frothier 14A may be altered by removing the bottom plate 96 and the parts formed on the bottom plate, by using a liquid inlet hole formed on the chamber 83 and adapted to be dipped into the milk in container 89 as the liquid passageway means to replace the flexible tube 93, and by relocating the positioning means 102 of the foam level control means 99 so that the fluid inlet 100 can be set a certain distance above the liquid inlet hole formed on the chamber 83. In both the alternatives for milk frothier 14A, the containing chamber 94 is generally open at its lower end and therefore allows the liquid jet from the liquid jet conduit 88 to thrust directly into the milk in container 89 thereby producing foam in the container.

To froth milk using the modified milk frothier 14A disclosed above, pour a desired amount of cold milk into container 89 and place the flexible conduit 93 into the liquid in the container 89. Adjust the position of the fluid inlet 100 of the foam level control means 99 with the understanding that the distance between the fluid inlet and the surface of milk will be approximately equal to the thickness of the foam to be produced on the milk.

Turn on the steam. A steam jet is issued from orifice 82 of the nozzle means 80 and causes a vacuum in the chamber 83. The vacuum in chamber 83 draws liquid into the chamber through the liquid passageway means 87. The steam jet then forces the liquid in the chamber 83 out of the chamber through outlet port 85 and into liquid jet conduit 88. After entering the liquid jet conduit, the liquid is transformed into a thin stream and is subsequently issued as liquid jet at high speed from the lower end of the liquid jet conduit 88. The liquid jet brings the surrounding air with it as it thrusts into the milk maintained in the space 97 of the containing chamber 94, therefore producing fine air bubbles in the containing chamber. The milk and fine air bubbles overflow the circular retaining wall 95 and exit the containing chamber 94 through openings 105 into the container 89, in which the fine air bubbles accumulate on the milk surface and form a layer of foam. The foam level continues to rise in the container 89 as the frothing operation continues. After the foam level reaches the fluid inlet 100 as illustrated in FIG. 5, the foam, rather than air, is introduced into the containing chamber 94. As a result, little additional foam is produced and the foam level in container 89 will rise very slowly or stay at around the level of the fluid inlet 100. In case that the foam level falls below the fluid inlet 100, additional air will be introduced to the liquid jet in the containing chamber 94. As a result, more foam will be produced until the foam reaches or covers the fluid inlet 100 again.

After the foam level reaches the fluid inlet, the main effect of the steam is to heat up the milk. After the milk is heated to a certain temperature, which is usually a little below the boiling point and is normally the right temperature for making milk containing drinks like cappuccino and latte, it is discovered that the liquid jet in most cases disappeared and the rate at which the milk is introduced into the chamber cylindrical 83 is decreased. It is also discovered that significantly more steam comes out of the containing chamber 94 and the milk frothier produces significantly more noise. Any of these signs, especially the increases in the steam quantity and noise level, can be used as the indicators to show the operators that the milk has been heated to the right temperature and is ready for use in making cappuccino or latte. As the operator notices any of these signs, he/she should turn off the steam.

Compared to the automatic milk frothier 14, the modified milk frothier 14A reduces the risk of milk splashing since the liquid jet does not thrust into the open container 89 directly. In addition, the modified milk frothier 14A reduces the risk of milk or foam overflow at the end of the frothing operation since the liquid jet, which contains significant amount of steam after the milk is heated above the certain temperature, thrusts into the milk in the containing chamber 94 wherein the steam is separated from the milk. The overheated milk will then flow out of outlet 105 and into container 89, while the steam, which now has much decreased speed, will flow out of the outlet 105 and into the surrounding atmosphere. The modified milk frothier 14A, however, is more complex than the milk frothier 14 and is more subject to clogging and mal-function since the foam level control means 99 may be clogged by the milk. But it is appreciated that unlike the air introduction means in the milk frothing attachments as disclosed in U.S. Pat. Nos. 4,735,133, 4,800,805, 4,945,824, 5,335,588, 4,779,519, 4,949,631, 5,265,519 and 5,330,266, the fluid passage way in the foam level control means 99 of milk frothier 14A can be made large enough to reduce the chance of clogging without impacting the performance of the milk frothier.

Figures 7, 9:
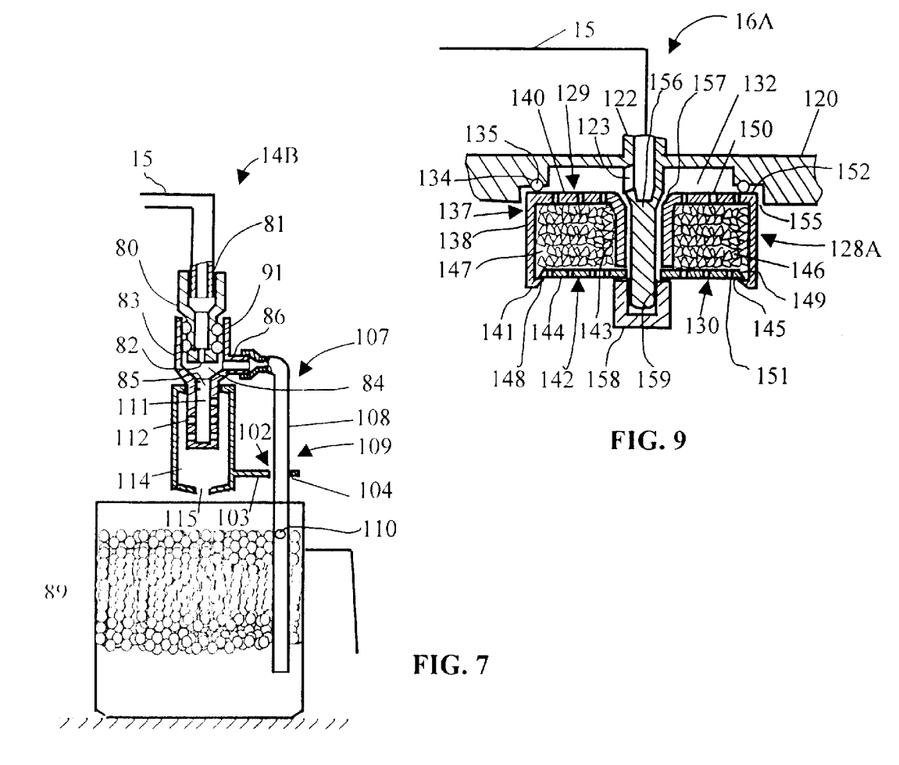
FIG. 7 is a sectional elevation view of another embodiment of the automatic milk frother 14 shown in FIG. 1.
FIG. 9 is a sectional elevation view of another embodiment of the hot water filter assembly 16 shown in FIG. 1.

Another modified embodiment of the automatic milk frothier 14 of FIG. 1 is specified, which, as illustrated in FIG. 7, produces fine air bubbles or foam by drawing both air and milk into the chamber 83 and mixing the air and milk therein. The modified automatic milk frothier 14B comprises milk passageway means 107 comprising a flexible tube 108 having one end connected to the inlet port 86 of chamber 83 and the other end free to move, foam level control means 109 comprising a fluid inlet hole 110 formed on the flexible tube 108 for introducing air and foam into the chamber 83 and the positioning means 102 which is similar the positioning means 102 for the modified milk frothier 14A of FIG. 5, a porous chamber 111 having exit holes 112 formed on the wall of the chamber, and a discharging chamber 114 formed around the porous chamber for collecting the mixture of milk and fine air bubbles from the exit holes 112 and discharging the mixture through a mixture outlet 115 into the container 89.

To froth milk using the modified milk frothier 14B disclosed above, pour a desired amount of cold milk into container 89 and place the flexible conduit 87 into the liquid in the container. Adjust the position of the fluid inlet 110 of the foam level control means 109 with the understanding that the distance between the fluid inlet 110 and the surface of milk in the container 89 will be approximately equal to the thickness of the foam to be produced on the milk in the container.

Turn on the steam. A steam jet is issued from orifice 82 of the nozzle means 80 and causes a vacuum in the chamber 83. The vacuum in chamber 83 draws milk from the container 89 and air from the fluid inlet 110 into the chamber through the flexible tube 87. The air, milk and steam are mixed in chamber 83 and forced out of the chamber 83 by the steam jet into the porous chamber 111. The air-milk mixture then enters the discharging chamber 114 and exits through discharge outlet 115 into container 89 where the fine air bubbles accumulate on top of the milk thereby producing a layer of foam. More foam is produced as the frothing operation continues. After the foam level in the container 89 reaches the fluid inlet 110 as illustrated in FIG. 7, the foam, rather than air, is drawn into the chamber 83. As a result, little additional foam is produced and the foam level in container 89 will rise very slowly or stay at around the level of the fluid inlet 110. In case that the surface of foam falls below the fluid inlet 110, additional air will be brought into the milk. As a result, more foam will be produced until the foam reaches or covers the fluid inlet 100 again.

After the foam level reaches the fluid inlet 110, the main effect of the steam is to heat up the milk. After the milk is heated to a certain temperature, which is usually a little below the boiling point and is normally the right temperature for making milk containing drinks like cappuccino and latte, it is discovered that significantly more steam comes out of the mixture outlet 115 and the milk frothier produces significantly more noise. Both the signs can be used as the indicators to show the operators that the milk has been heated to the right temperature and is ready for use in making cappuccino or latte. As the operator notices any of these signs, he/she should turn off the steam.

Compared to the automatic milk frothier 14, the modified milk frothier 14B reduces the risk of milk splash and foam overflow at the end of the frothing operation. The modified milk frothier 14B, however, is more subject to clogging and mal-function since the fluid inlet 110 must be small, produces more noise during the frothing operation, and is more complex.

Figure 8:
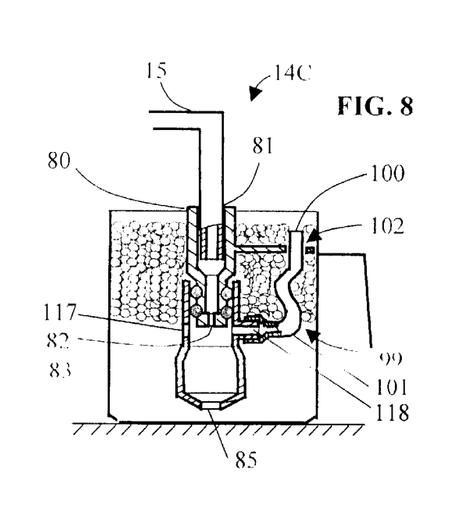
FIG. 8 is a sectional elevation view of another embodiment of the automatic milk frother 14 shown in FIG. 1.

FIG. 8 shows another modified embodiment of the automatic milk frothier 14 of FIG. 1. The modified milk frothier 14C, like the modified frothier 14B, produces foam or fine air bubbles in the milk by drawing both air and milk into the chamber 83 and mixing the air and milk therein. The modified automatic milk frothier 14C comprises at least one opening 117 formed on the chamber 83 as the milk passageway into the chamber, an air inlet 118 formed on the chamber 83, and foam level control means 99 connected to the air inlet 118 for regulating the introduction of air or foam into the chamber. The foam level control means is similar to that illustrated in FIGS. 5 and 6. The opening 117 and air inlet 118 are located sufficiently close to the orifice 82 so that the steam jet from the orifice can draw milk through opening 117 and air through fluid inlet 100, fluid passageway 101 and air inlet 118 into the chamber. To froth milk using the modified milk frother 14C of FIG. 8, pour an amount of cold milk into container 89 and insert the milk frother into the container so that the opening 117 is immersed in the liquid. Adjust the position of the fluid inlet 100 of the foam level control means 99 with the understanding that the distance between the fluid inlet 100 and the surface of milk in the container 89 will be approximately equal to the thickness of the foam to be produced on the milk in the container. Turn on the steam. A steam jet is issued from orifice 82 of the nozzle means 80 and causes a vacuum in the chamber 83. The vacuum in chamber 83 draws milk from the container 89 through the opening 117 and air from the fluid inlet 100 through the flexible tube 101 into the chamber 83. The air, milk and steam are mixed in chamber 83 and forced out of the chamber by the steam jet into container 89. In the container 89 the air bubbles from the milk-air mixture accumulates on top of the milk and forms a layer of foam. The foam layer thickness increases as the frothing operation continues. After the foam level in the container 89 reaches the fluid inlet 100 as illustrated in FIG. 8, the foam, rather than air, is drawn into the chamber 83. As a result, little additional foam is produced and the foam level in container 89 will rise very slowly or stay at around the level of the fluid inlet 100. At the same time as foam is being produced, the milk is being heated. After the milk is heated to a certain temperature, which is usually a little below the boiling point and is normally the right temperature for making milk containing drinks like cappuccino and latte, it is noticed that significantly more steam appears around the milk frother and the foam level in the container 89 starts to rise quickly. Both the signs, especially the rapid rise in foam level, can be used as the indicators to show the operators that the milk has been heated to the right temperature and is ready for use in making cappuccino or latte. As the operator notices any of these signs, he/she should turn off the steam.

Compared to the automatic milk frother 14, the modified milk frother 14C is more subject to milk splash and milk overflow since the milk frother 14C is immersed in the milk, is more subject to clogging and mal-function since the foam level control means 99 must be small and can be easily clogged by the milk, is more difficult to clean, and produces frothing more.

Figure 1B:
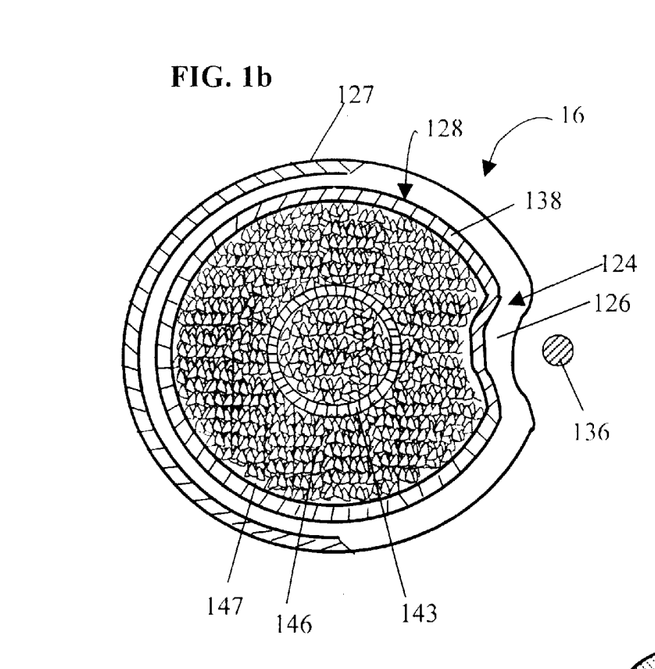
FIG. 1b is a sectional view of the hot water filter system shown in FIG. 1, taken along the line II—II.

Refer now to the hot water filter assembly 16 as illustrated in FIGS. 1 and 1b, the assembly comprises a brew head member 120 comprising a hot water inlet 122 connected to hot water conduit 17 and a hot water outlet 123, a water filter cartridge 128 having a hot water inlet 129 and a filtered water outlet 130, a compartment 124 comprising a substantially round support base 121 with openings 125, a side support wall 127 and an opening 126 for allowing the water filter cartridge 128 to be inserted into and removed out of the compartment 124, and a water distribution chamber 132 formed between the hot water outlet 123 of the brew head member 120 and the hot water inlet 129 of the water filter cartridge 128. The compartment 124 is attached to the brew head member 120 by attachment means 133. A circular slot 134 is formed around the hot water outlet 123 on the brew head member 120 to receive a sealing O-ring 135

The water filter cartridge 128 is dimensioned to fit into the compartment 124 and to form a water-tight seal between the hot water inlet 129 and the O-ring 135. The water filter cartridge comprises a first member 137 having a substantially cylindrical side wall 138, a generally flat upper end wall 140 on which the hot water inlet 129 is formed, a generally open lower end with an internal shoulder 141 with a bevel edge 148, a second member 142 having a substantially cylindrical side wall 143, a generally flat lower end wall 144 on which the filtered water outlet 130 is formed, an external shoulder 145 with a bevel edge 149 formed at the lower end wall 144, a generally open upper end, and a space 147 formed between the upper end wall 140 of the first member 137 and the lower end wall 144 of the second member 142 for containing a predetermined amount of water filtration materials such as activated carbon 146. A handle 136 is located on the side wall 138 of the first member 137 for assisting in mounting and removing the water filter cartridge 128 into and out of the compartment 124.

The hot water inlet 129 on the upper end wall 140 comprises numerous holes 150 which are small enough to prevent the filter material from leaking out of the cartridge 128. The holes 150 are all located a certain distance away from the side wall 138 so that a peripheral ring area 152 where no holes are present is formed below the sealing O-ring 135. The filtered water outlet 130 on the lower end wall 144 of the second member 142 comprises numerous holes 151 which are small enough to prevent the filter material from leaking out of the water filter cartridge 128.

The internal shoulder 141 of the first member 137 and the external shoulder 145 of the second member 142 are so constructed that the second member can be snapped into the first member. The bevel edge 148 of the internal shoulder 141 and the bevel edge 149 of the external shoulder 145 are so formed to facilitate the snapping action. The cylindrical side wall 143 of the second member 142 is located a certain distance away from the bevel edge 149 and is sufficiently tall that it can cause certain tension between the internal shoulder 141 and the external shoulder 145 after the cartridge 128 is assembled. The tension between the internal and external shoulders provides a water-tight seal between the first member 137 and second member 142.

It is appreciated that the hot water filter assembly can be slightly modified by removing the circular slot 134 and the sealing O-ring 135 from the brew head member 120 and placing them on the peripheral ring area 152 of the upper end wall 140 of the first member 137 (not shown). It is also appreciated that the compartment 124 can be formed as an integral part of the brew head member 120 (not shown).

A modified embodiment of the hot water filter assembly 16 of FIG. 1 and FIG. 1a is shown in FIG. 9. Unlike the filter assembly 16 which uses the compartment 124 to receive and retain the water filter cartridge 128 in place, the modified hot water filter assembly 16A uses a bolt 156 formed on the brew head member 120 and a nut 158 to receive and retain the modified water filter cartridge 128A in place. The cartridge 128A has a cylindrical central hole 157 formed by extending downwards both the upper end wall 140 of the first member 137 and the lower end wall 144 of the second member 142 for receiving the bolt 156. When mounting the cartridge 128A onto the brew head member 120, one simply pushes the cartridge upwards so that bolt 156 is received in the central hole 157 and the first member 137 is received by a recession 155 formed on the brew head member 120, and then tightens the nut 158 through thread 159 onto the bolt 156.

The scope of the invention is obviously not restricted to the embodiments described by way of examples and depicted in the drawings, there being numerous changes, modifications, additions, and applications thereof imaginable within the purview of the claims.

What is claimed is:

1. For use with an apparatus having a steam-supplying conduit for making drinks for human consumption or enjoyment, a device comprising:

nozzle means connected to said steam-supplying conduit for producing at least one steam jet;

a chamber having a steam inlet port for receiving said steam jet and a fluid outlet port;

means for producing vacuum in said chamber by said steam jet;

liquid passageway means in communication with said chamber for drawing in liquid such as milk by the vacuum in said chamber, said liquid passageway means including a liquid conduit adapted to be dipped into a first vessel containing liquid such as milk;

liquid jet means for transforming the liquid such as milk which is drawn into said chamber by the vacuum in said chamber into at least one liquid jet, said liquid jet means having a first end which communicates with said fluid outlet of said chamber and a second end from which said liquid jet issues;

an arrangement that allows said liquid jet from said liquid jet means to thrust into the liquid such as milk in a containing means in the form of a first vessel, said liquid jet bringing the surrounding air into the liquid such as milk in said containing means thereby producing in said containing means fine air bubbles or foam; and foam level control means for the operator of said device to control the amount of foam to be produced on the liquid in said first vessel.

2. A device as defined in claim 1 wherein said foam level control means comprises a hollow member such as a hollow cylinder adapted to be moved up and down relative to said liquid jet means by the operator of said device.

3. For use with an apparatus having a steam-supplying conduit for making drinks for human consumption or enjoyment, a device comprising:

nozzle means connected to said steam-supplying conduit for producing at least one steam jet;

a chamber having a steam inlet port for receiving said steam jet and a fluid outlet port;

means for producing vacuum in said chamber by said steam jet;

liquid passageway means in communication with said chamber for drawing in liquid such as milk by the vacuum in said chamber, said liquid passageway means including a liquid conduit adapted to be dipped into a first vessel containing liquid such as milk;

liquid jet means for transforming the liquid such as milk which is drawn into said chamber by the vacuum in said chamber into at least one liquid jet, said liquid jet means having a first end which communicates with said fluid outlet of said chamber and a second end from which said liquid jet issues;

an arrangement that allows said liquid jet from said liquid jet means to thrust into the liquid such as milk in a containing means, said liquid jet bringing the surrounding air into the liquid such as milk in said containing means thereby producing in said containing means fine air bubbles or foam;

a shielding chamber for at least partially shielding the liquid jet from the view of the operators, said shielding chamber having an upper end for receiving said liquid jet from said liquid jet means and a substantially open lower end for said liquid jet to exit said second chamber; and foam level control means including a fluid inlet for fluid such as air and foam, a fluid passageway for providing communication between said fluid inlet and said liquid jet in said shielding chamber so that said liquid jet in said shielding chamber can draw air or foam from said fluid inlet by way of said fluid passageway to said liquid jet in said shielding chamber, and positioning means for the operator of said device to set said fluid inlet at a position a certain distance above the liquid in said containing means, which is preferably said first vessel, said foam level control means introducing air into said fluid passageway when the foam in said containing means is below or away from said fluid inlet and introducing foam into said fluid passageway when the foam in said containing means reaches or covers said fluid inlet.

4. A device as defined in claim 3 wherein said fluid passageway comprises a flexible tube such as an elastomer tube with one end connected to said shielding chamber and the other end as said fluid inlet and said positioning means comprises holding means for holding said flexible tube in position after the position of said fluid inlet has been adjusted by the operator of said device.

5. For use with an apparatus having a steam-supplying conduit for making drinks for human consumption or enjoyment, a device comprising:

nozzle means connected to said steam-supplying conduit for producing at least one steam jet;

a chamber having a steam inlet port for receiving said steam jet and a fluid outlet port;

means for producing vacuum in said chamber by said steam jet;

liquid passageway means in communication with said chamber for drawing in liquid such as milk by the vacuum in said chamber, said liquid passageway means including a liquid conduit adapted to be dipped into a first vessel containing liquid such as milk;

liquid jet means for transforming the liquid such as milk which is drawn into said chamber by the vacuum in said chamber into at least one liquid jet, said liquid jet means having a first end which communicates with said fluid outlet of said chamber and a second end from which said liquid jet issues;

an arrangement that allows said liquid jet from said liquid jet means to thrust into the liquid such as milk in a containing means, said liquid jet bringing the surrounding air into the liquid such as milk in said containing means thereby producing in said containing means fine air bubbles or foam;

wherein said containing means constitutes part of said device, said containing means comprising a containing chamber, keeping means for maintaining an amount of liquid such as milk in said containing chamber during the operation of said device, an air inlet located near the upper portion of said containing chamber, a liquid inlet adapted to receive and direct said liquid jet into the liquid such as milk maintained in said containing chamber thereby producing fine air bubbles or foam in said containing chamber, and a discharging outlet for discharging the liquid and foam.

6. A device as defined in claim 5 further comprising foam level control means comprising an fluid inlet for fluid such as air and foam, a fluid passageway connected to said air inlet of said containing chamber for providing communication between said fluid inlet and said containing chamber so that said liquid jet in said containing chamber can draw air or foam from said fluid inlet by way of said fluid passageway into said containing chamber, and positioning means for the operator of said device to set said fluid inlet at a position a certain distance above the liquid in said first vessel, said foam level control means introducing air into said fluid passageway when the foam in said first vessel is below or away from said fluid inlet and introducing foam into said fluid passageway when the foam in said first vessel reaches or covers said fluid inlet.

7. For use with an apparatus having a steam supplying conduit for making drinks for human consumption or enjoyment, a device comprising:

nozzle means connected to said steam-supplying conduit for producing at least one steam jet;

a chamber having a steam inlet port for receiving said steam jet and a fluid outlet port;

means for producing vacuum in said chamber by said steam jet;

liquid passageway means in communication with said chamber for drawing in liquid such as milk by the vacuum in said chamber, said liquid passageway means comprising a hole on said chamber, said hole on said chamber being adapted to be dipped into a vessel containing liquid such as milk;

liquid jet means for transforming the liquid such as milk which is drawn into said chamber by the vacuum in said chamber into at least one liquid jet, said liquid jet means having a first end which communicates with said fluid outlet of said chamber and a second end from which said liquid jet issues;

an arrangement that allows said liquid jet from said liquid jet means to thrust into the liquid such as milk in a containing means, said liquid jet bringing the surrounding air into the liquid such as milk in said containing means thereby producing in said containing means fine air bubbles or foam; and foam level control means comprising a fluid inlet for fluid such as air and foam, a fluid passageway for providing communication between said fluid inlet and said liquid jet so that said liquid jet can draw said air or foam from said fluid inlet by way of said fluid passageway, and positioning means for the operator of said device to set said fluid inlet at a position a certain distance above the liquid such as milk in said vessel, said foam level control means introducing air into said fluid passageway when the foam in said vessel is below or away from said fluid inlet and introducing foam into said fluid passageway when the foam in said vessel reaches or covers said fluid inlet.

8. A device as defined in claim 7 wherein said fluid passageway comprises a flexible tube such as an elastomer tube with one end located adjacent to said liquid jet from said liquid jet means and the other end functioning as said fluid inlet, and said positioning means comprises holding means for holding said flexible tube in position after the position of said fluid inlet has been adjusted by the operator of said device.

9. For use with a coffee making machine having a steam-supplying conduit, a device for producing frothed milk in an essentially automatic fashion comprising:

nozzle means connected to said steam-supplying conduit for producing a steam jet;

a chamber adapted for receiving said steam jet and generating a vacuum in said chamber by said steam jet;

milk passageway means connected to said chamber for drawing in milk by the vacuum in said chamber;

foam level control means comprising a fluid inlet for fluid such as air or foam, a fluid passageway for providing communication between said fluid inlet and said chamber so that the vacuum generated by said steam jet in said chamber can draw said air or foam from said fluid inlet by way of said fluid passageway into said chamber, and positioning means for the operator of said device to adjust the position of said fluid inlet, said foam level control means introducing air into said fluid passageway when the foam on the frothed milk is below or away from said fluid inlet and introducing foam into said fluid passageway when the foam on the frothed milk reaches or covers said fluid inlet; and a discharge outlet formed on said chamber and positioned below said nozzle means for discharging the mixture of milk and foam produced in said chamber.

10. A device as defined in claim 9 wherein said milk passageway means comprises a hole formed on said chamber, said hole on said chamber being adapted to be dipped into a vessel containing milk.

11. A device as defined in claim 9 wherein said milk passageway means comprises a flexible tube such as a elastomer tube having one end connected to said chamber and the other end adapted to be dipped into a vessel containing milk.

12. A device as defined in claim 11 wherein said fluid inlet of said foam level control means is formed on a particular position of said flexible tube, and said positioning means comprises holding means for holding said flexible tube in position after the position of said fluid inlet has been adjusted by the operator of said device.

13. A device as defined in claim 9 wherein said fluid passageway comprises a flexible tube such as an elastomer tube with one end connected to said chamber and the other end acting as said fluid inlet, and said positioning means comprises holding means for holding said flexible tube in position after the position of said fluid inlet has been adjusted by the operator of said device.

14. A steam device for using pressurized hot steam produced by a water heater to generate visually appealing foam on a liquid such as milk and to heat the liquid comprising:

a chamber having a steam inlet for pressurized hot steam, a liquid inlet for liquid and a fluid outlet for liquid and steam, said steam inlet, liquid inlet and fluid outlet being so arranged to enable the pressurized hot steam from said steam inlet to cause a vacuum in said chamber thereby drawing liquid into said chamber through said liquid inlet;

a liquid conduit adapted to be dipped into a container containing an amount of liquid such as milk, said liquid conduit being connected to said liquid inlet;

a transformer for transforming and accelerating the fluid from said chamber into a high-speed jet of liquid, said transformer comprising an inlet for the fluid from said fluid outlet of said chamber, a liquid-jet outlet port, and a predetermined length of sufficiently small channel downstream said inlet of said transformer for accelerating the fluid and causing a jet of liquid to issue from said liquid-jet outlet port at a speed sufficiently high to cause the formation of foam;

a length of substantially open, unobstructed space adapted to be above the liquid such as milk in the container and downstream said liquid-jet outlet port, said length of substantially open, unobstructed space being substantially open to atmosphere and allowing the high-speed jet of liquid to pass through substantially freely, the high-speed jet of liquid becoming impregnated with air in said length of substantially open, unobstructed space; and a circulation loop to be formed during the operation of said steam device for allowing the circulation of the liquid such as milk between the container and said steam device in order to cause gradual temperature increase of the liquid and formation of foam in the container, in said circulation loop the liquid such as milk in the container being drawn into said chamber via said liquid conduit and transformed into a high-speed jet of liquid by said transformer, the jet of liquid passing through said length of substantially open, unobstructed space and becoming impregnated with air, and the jet of liquid thrusting back into the liquid in the container at a speed sufficiently high to interact vigorously with the liquid in the container thereby generating visually appealing foam.

15. A steam device as defined in claim 14 further comprising means to produce significantly more visible steam or frothing sound after the liquid such as milk in the container has reached a certain temperature.

16. A steam device as defined in claim 14 wherein said liquid conduit is adapted to have a sufficiently large cross-section area for the passage of the liquid to increase the volume flow rate of the liquid such as milk from the container to said chamber at a given vacuum in said chamber, thereby increasing the speed of said high-speed jet of liquid.

17. A steam device as defined in claim 14 wherein said sufficiently small channel of said transformer having a cross-section of approximately 0.001 inch$^2$ to approximately 0.02 inch$^2$ in area or approximately 0.04 inches to approximately 0.1 inches in diameter.

18. A steam device for using pressurized hot steam produced by a water heater to generate visually appealing foam on a liquid such as milk and to heat the liquid comprising:

a chamber having a steam inlet for pressurized hot steam, a liquid inlet for liquid and a fluid outlet for liquid and steam, said steam inlet, liquid inlet and fluid outlet being so arranged to enable the pressurized hot steam from said steam inlet to cause a vacuum in said chamber thereby drawing liquid into said chamber through said liquid inlet;

a liquid conduit connected to said liquid inlet;

a transformer for transforming and accelerating the fluid from said chamber into a high-speed jet of liquid, said transformer comprising an inlet for the fluid from said fluid outlet of said chamber, a liquid-jet outlet port, and a predetermined length of sufficiently small channel downstream said inlet of said transformer for accelerating the fluid and causing a jet of liquid to issue from said liquid-jet outlet port at a speed sufficiently high to cause the formation of foam; and a foaming mechanism comprising a length of substantially open, unobstructed space open to atmosphere for allowing the high-speed jet of liquid from said liquid-jet outlet port to pass through substantially freely and for impregnating the high-speed jet of liquid with air in said length of substantially open, unobstructed space, said foaming mechanism further comprising an arrangement for causing the high-speed jet of liquid now impregnated with air to thrust into a container at the sufficiently high speed, thereby allowing the high-speed jet of liquid impregnated with air to interact vigorously with the liquid such as milk in the container and to generate visually appealing foam in the container.

19. A steam device as defined in claim 18 wherein said length of substantially open, unobstructed space comprises an elongated member having a opening for the high-speed jet of liquid to pass through, said opening being sufficiently large that said elongated member appears unobstructed or wall-less to the high-speed jet of liquid.

20. A steam device as defined in claim 18 wherein said length of substantially open, unobstructed space is wall-less.

21. A steam device as defined in claim 18 wherein said sufficiently small channel of said transformer having a cross-section of approximately 0.001 inch$^2$ to approximately 0.02 inch$^2$ in area or approximately 0.04 inches to approximately 0.1 inches in diameter.

* * * * *